United States Patent
Agirman et al.

(10) Patent No.: US 6,492,788 B1
(45) Date of Patent: Dec. 10, 2002

(54) METHOD AND APPARATUS FOR ENCODERLESS OPERATION OF A PERMANENT MAGNET SYNCHRONOUS MOTOR IN AN ELEVATOR

(75) Inventors: Ismail Agirman, New Britain, CT (US); Aleksandar M. Stankovic, Boston, MA (US); Chris Czerwinski, Middletown, CT (US); Ed Piedra, Chicopee, MA (US)

(73) Assignee: Otis Elevator Company, Farmington, CT (US)

(*) Notice: Subject to any disclaimer, the term of this patent is extended or adjusted under 35 U.S.C. 154(b) by 0 days.

(21) Appl. No.: 09/709,833

(22) Filed: Nov. 10, 2000

(51) Int. Cl.[7] .............................. H02P 1/46; H02P 3/18; H02P 5/28; H02P 7/36
(52) U.S. Cl. ....................... 318/700; 318/537; 318/809; 363/160
(58) Field of Search ................... 318/432, 433, 318/430, 439, 530, 537, 726, 719, 718, 139, 715, 801, 807, 802, 811, 803, 805, 720, 799, 809, 700; 363/160

(56) References Cited

U.S. PATENT DOCUMENTS

| | | | |
|---|---|---|---|
| 5,504,404 A | * 4/1996 | Tamaki et al. | 318/139 |
| 5,541,488 A | * 7/1996 | Bansal et al. | 318/801 |
| 5,559,419 A | 9/1996 | Jansen et al. | 318/808 |
| 5,565,752 A | 10/1996 | Jansen et al. | |
| 5,585,709 A | 12/1996 | Jansen et al. | |
| 5,608,300 A | 3/1997 | Kawabata et al. | |
| 5,656,911 A | * 8/1997 | Nakayama et al. | 318/718 |
| 5,708,346 A | * 1/1998 | Schob | 318/803 |
| 5,886,498 A | 3/1999 | Sul et al. | |
| 5,903,128 A | 5/1999 | Sakakibara et al. | |
| 5,920,161 A | * 7/1999 | Obara et al. | 180/65.4 |
| 5,952,810 A | 9/1999 | Yamada et al. | |
| 5,963,007 A | * 10/1999 | Toyozawa et al. | 318/677 |
| 5,990,657 A | * 11/1999 | Masaki et al. | 318/139 |
| 6,081,093 A | * 6/2000 | Oguro et al. | 318/801 |
| 6,137,258 A | 10/2000 | Jansen | 318/802 |
| 6,163,127 A | * 12/2000 | Patel et al. | 318/700 |
| 6,163,128 A | * 12/2000 | Hiti et al. | 318/433 |
| 6,255,798 B1 | * 7/2001 | Obara et al. | 318/432 |
| 6,281,656 B1 | * 8/2001 | Masaki et al. | 318/700 |

(List continued on next page.)

FOREIGN PATENT DOCUMENTS

| | | |
|---|---|---|
| EP | 0943527 | 9/1999 |
| JP | 2001-86788 A | * 3/2001 |

OTHER PUBLICATIONS

Publication from *IEEE Transaction on Power Electronics*, vol. 14, No. 1, Jan. 1999 entitled Sensorless Torque Control of Salient–Pole Synchronous Motor at Zero–Speed Operation by Takashi Aihara, Akio Toba Yanase, Akihide Mashimo, and Kenji Endo.

(List continued on next page.)

*Primary Examiner*—Jeffrey Donels

(57) ABSTRACT

A permanent magnet synchronous motor is controlled using d-axis current and q-axis current along with respective d-current and q-current feedback loops. The speed and position of the motor are determined by injecting a first signal into the d-axis current and observing the response in the q-current feedback loop. Part of the q-current feedback signal is demodulated with a second signal which is 90 degrees out of phase from the first signal. The demodulated signal is preferably sent through a low pass filter before being received by an observer controller. The observer controller outputs a position estimate which is used to modify the d-current feedback signal and a speed estimate which is used to modify the q-axis current.

20 Claims, 3 Drawing Sheets

U.S. PATENT DOCUMENTS

| | | | | |
|---|---|---|---|---|
| 6,320,349 | B1 | * | 11/2001 | Kaneko et al. ............. 318/700 |
| 6,329,781 | B1 | * | 12/2001 | Matsui et al. ............... 318/139 |
| 2001/0006335 | A1 | * | 7/2001 | Kondou et al. ............. 318/727 |
| 2001/0024100 | A1 | * | 9/2001 | Shinnaka .................... 318/701 |
| 2001/0028229 | A1 | * | 10/2001 | Koga et al. ................... 318/38 |

OTHER PUBLICATIONS

Publication from 1996 *IEEE* entitled Rotor Position and Velocity Estimation for a Permanent Magnet Synchronous Machine at Standstill and High Speeds by M.J. Corley, Associat Engineer, and Prof. R.D. Lorenz, Dept. of Electrical Engineering, University of Wisconsin–Madison, Madison WI dated 1996.

Publication from 1997 *IEEE* entitled Vector Control of Interior Permanent Magnet Synchronous Motor Without a Shaft Sensor by Jang–Mok Kim, Seog–Joo Kang, Seung–Ki Sul, School of Electrical Engineering, Seoul National University, Seoul, Korea/LG Industrial Systems Co., Ltd., Building Systems Research Lab, Incheon, Korea.

Publication from *IEEE Proceedings–B*, vol. 138, No. 1, Jan. 1991 entitled Implicit rotor–position sensing using motor windings for a self–commutating permanent–magnet drive system by Prof. K.J. Binns, DSc, CEng. FIEE, D.W. Shimmin, Phd, and K.M. Al–Aubidy, Phd.

* cited by examiner

METHOD AND APPARATUS FOR ENCODERLESS OPERATION OF A PERMANENT MAGNET SYNCHRONOUS MOTOR IN AN ELEVATOR

FIELD OF THE INVENTION

This invention pertains to the field of sensing a position of an elevator motor, and in particular, to sensing the position of the motor without using an encoder.

BACKGROUND OF THE INVENTION

There exists a considerable interest in the motion control industry for AC drives that do not use any mechanical position or speed sensors. Such a mode of operation is commonly referred to as sensorless control. Since shaft sensors are expensive, delicate, and require additional cabling, removing shaft sensors from motion control configurations is likely to result in reduced system costs while improving overall reliability.

A synchronous AC motor can achieve a desired torque production only if the applied stator waveforms, typically voltages, have phase which is coordinated with the rotor position. A knowledge of the rotor position is thus essential for smooth operation of an elevator drive.

The present invention uses characteristics of a permanent magnet synchronous motor (PMSM) to determine the position of the motor. An electric motor relies on two basic principles of electromagnetism. First, whenever electric current is passed through a wire, an electromagnetic field is created around the wire with a strength proportional the amount of current, and second, whenever wire is moved through a magnetic field, electric current is generated in the wire which depends on the strength of the magnetic field, the size of the wire, and the speed and distance at which the wire moves through the magnetic field.

A PMSM motor is an AC motor that includes a stationary section called the stator, and a rotating section called the rotor. Wire windings and north-south magnetic poles in the stator are arranged so that an AC current introduced into the windings causes a magnetic field that rotates around the stator. This rotating magnetic field then induces a current in the rotor. The induced rotor current produces a magnetic field that chases the rotating stator field, thus causing the rotor, which is attached to a shaft, to turn. The speed of rotation of the magnetic field is called the synchronous speed of the motor. The rotor electromagnet tries to catch the rotating stator magnetic field, but as it approaches alignment with the stator, the rotating magnetic field no longer intersects the rotor conductors, so the induced current decreases and the rotor field decreases. The rotor then slows down and "slips" below the speed of the stator's rotating magnetic field. As the rotor slows, more conductors are intersected by the rotating magnetic field, causing the rotor current and field to increase again, resuming the chase of the stator field. The synchronous motor in a steady state tends to run at a nearly constant speed depending on the frequency of the applied AC voltage. The AC motor torque is a function of the amplitude and phase of the applied AC voltage.

Attempts have been made to quickly and reliably determine the rotor position of a synchronous motor. T. Aihara, A. Toba, T. Yanase, A. Mashimo, and K. Endo, in "Sensorless Torque Control of Salient-Pole Synchronous Motor at Zero-Speed Operation", IEEE Trans. Power Electronics, 14(10), 1999, pp. 202–208, disclose a position and speed sensorless control using the counter emf of a PMSM. A voltage signal is injected into the d-axis and observe the response in the q-current. Processing is done with a fast Fourier transform (FFT).

M. J. Corley and R. D. Lorenz, in "Rotor Position and Velocity Estimation for a PMSM at Standstill and High Speeds", IEEE IAS Annual Meeting, 1996, pp. 36–41, disclose adding probing voltage signals to both axes (but dominantly in the d-axis, which is labeled as q-axis in the paper); the q-current is later used for position determination. The algorithm shows a steady-state offset.

U.S. Pat. Nos. 5,585,709 and 5,565,752 (Jansen et al.), both entitled "Method and Apparatus for Transducerless Position and Velocity Estimation in Drives for AC Machines" disclose injecting a high frequency signal onto the fundamental drive frequency in the stator windings of the motor.

J. M. Kim, S. J. Kang, and S. K. Sul, in "Vector Control of Interior PMSM Without a Shaft Sensor", Applied Power Electronics Conference, 1997. pp. 743–748, disclose a control method wherein the switching pattern is modified by injecting a probing current signal into the q-axis, and voltage responses are processed to evaluate the positional error. This means that the injected frequency has to be well within the bandwidth of the current regulator.

U.S. Pat. No. 5,886,498 (Sul et al.) entitled "Sensorless Field Orientation Control Method of an Induction Machine by High Frequency Signal Injection" discloses injecting a fluctuating high frequency signal at a reference frame rotating synchronously to the fundamental stator frequency.

U.S. Pat. No. 5,608,300 (Kawabata et al.) entitled "Electrical Angle Detecting Apparatus and Driving System of Synchronous Motor Using the Same" and U.S. Pat. No. 5,952,810 (Yamada et al.) entitled "Motor Control Apparatus and Method for Controlling Motor" consider cases when both step and sinusoidal signals are injected in the motor. In the case of sinusoidal injection, a band-pass filter is used to extract the important part of the response. These disclosures concentrate on initial position detection of the rotor.

U.S. Pat. No. 5,903,128 (Sakakibara et al.) entitled "Sensorless Control System and Method of Permanent Magnet Synchronous Motor" discloses modifying the supply voltage so that the position can be inferred from the system response. The modification, however, is quite simple (one or two pulses), so it is likely to result in limited performance.

SUMMARY OF THE INVENTION

Briefly stated, a permanent magnet synchronous motor is controlled using d-axis current and q-axis current along with respective d-current and q-current feedback loops. In one embodiment of the invention which is described in detail below, the speed and position of the motor are determined by injecting a first signal into the d-axis current and observing the response in the q-current feedback loop. Part of the q-current feedback signal is demodulated with a second signal which is 90 degrees out of phase from the first signal.

The demodulated signal is preferably sent through a low pass filter before being received by an observer controller. The observer controller outputs a position estimate which is used to modify the d-current feedback signal and a speed estimate which is used to modify the q-axis current.

According to an embodiment of the invention, an apparatus for determining speed and position of a permanent magnet synchronous motor includes d-axis current means for providing d-axis current to the motor; the d-axis current means including a d-current feedback loop; q-axis current means for providing q-axis current to the motor; the q-axis current means including a q-current feedback loop; means for injecting a first signal into the d-axis current means; position estimating means for measuring current feedback responsive to the injected first signal to determine an estimated position of the motor; and speed estimating means for measuring current feedback responsive to the injected first signal to determine an estimated speed of the motor.

According to an embodiment of the invention, a method for determining speed and position of a permanent magnet synchronous motor includes the steps of (a) providing d-axis current to the motor, including providing a d-current feedback loop; (b) providing q-axis current to the motor, including providing a q-current feedback loop; (c) injecting a first signal into the d-axis current outside of the d-current feedback loop; (d) measuring current feedback responsive to the injected first signal to determine an estimated position of the motor; and (f) measuring current feedback responsive to the injected first signal to determine an estimated speed of the motor.

DETAILED DESCRIPTION OF THE PREFERRED EMBODIMENT

Mathematical Model

Figure 1:
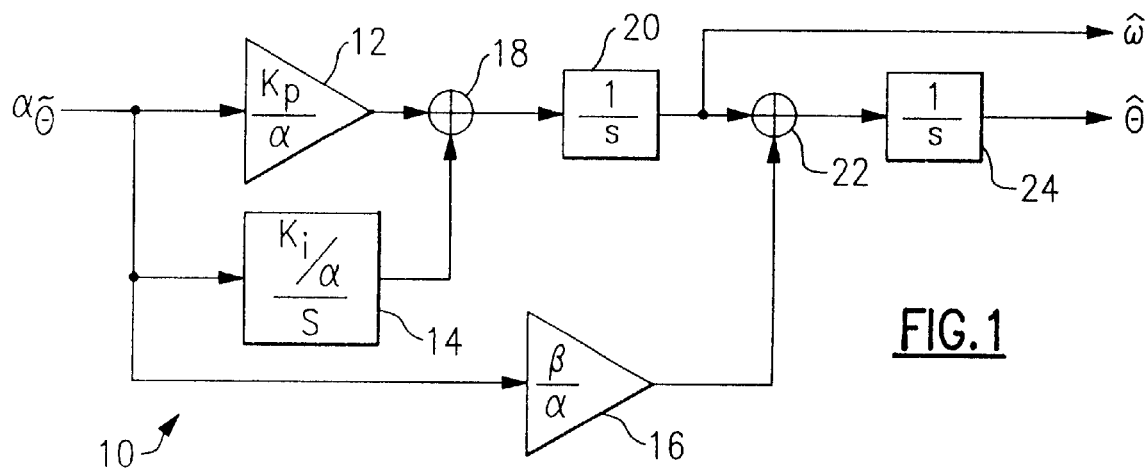
FIG. 1 shows an observer controller used in an embodiment of the present invention.

The modeling assumptions about the machine are standard and include magnetic linearity, geometric symmetry of poles and phases, the absence of the cogging torque, and mutual and self inductances that have all even harmonics (spatially). We assume only the DC and second harmonic component, as the inclusion of higher harmonics only complicates the vector of fluxes due to permanent magnets. Under these assumptions, we write a model for the electrical subsystem of the machine in an estimated synchronous frame. Let $$L_\Sigma = \frac{L_d + L_q}{2} \text{ and } L_\Delta = \frac{L_d - L_q}{2},$$

where $L_\Sigma$ is the average of the d-axis and q-axis inductances and $L_\Delta$ is the differential of the d-axis and q-axis inductances. Quantities with a "hat" (such as $\hat{x}$) denote estimates (of x), and quantities with "tildes" denote the errors, e.g., $\tilde{x} = x - \hat{x}$. Then we can write for the electrical subsystem $$\begin{bmatrix} v_d \\ v_q \end{bmatrix}(t) = \quad \text{Equation (1)}$$

$$\begin{bmatrix} R & \\ & R \end{bmatrix}\begin{bmatrix} i_d \\ i_q \end{bmatrix} + \begin{bmatrix} L_\Sigma + L_\Delta\cos2\tilde{\theta} & -L_\Delta\sin2\tilde{\theta} \\ -L_\Delta\sin2\tilde{\theta} & L_\Sigma - L_\Delta\cos2\tilde{\theta} \end{bmatrix}\frac{d}{dt}\begin{bmatrix} i_d \\ i_q \end{bmatrix} +$$

$$\hat{\omega}\begin{bmatrix} L_\Delta\sin2\tilde{\theta} & -L_\Sigma + L_\Delta\cos2\tilde{\theta} \\ L_\Sigma + L_\Delta\cos2\tilde{\theta} & -L_\Delta\sin2\tilde{\theta} \end{bmatrix}\begin{bmatrix} i_d \\ i_q \end{bmatrix} +$$

$$2\tilde{\omega}L_\Delta\begin{bmatrix} -\sin2\tilde{\theta} & -\cos2\tilde{\theta} \\ -\cos2\tilde{\theta} & \sin2\tilde{\theta} \end{bmatrix}\begin{bmatrix} i_d \\ i_q \end{bmatrix} +$$

$$\omega\begin{bmatrix} \cos\tilde{\theta} & \sin\tilde{\theta} \\ -\sin\tilde{\theta} & \cos\tilde{\theta} \end{bmatrix}\begin{bmatrix} 0 \\ \Phi \end{bmatrix}$$

We consider the case in which only electrical subsystem is used in parameter estimation, as the mechanical subsystem is too slow for this purpose. Note that, in principle, we could find the unknown quantities (position and electrical parameters) from Equation 1 using standard estimation reasoning: measure the electrical quantities (voltages and currents), process the signals to obtain a good approximation for the derivative (say by using state filters or other band-limited differentiation), and estimate the unknown parameters (say using the least squares method). The main issue is that we need the persistency of excitation, i.e., the signals should vary (in normal operation) enough to enable the estimation. This condition, however, is typically not satisfied in practice, and we are interested in modification in voltages and currents that enable estimation, while maintaining energy-efficient operation. The problem at hand is one of input design, i.e., what should we select for $v_d(t)$ and $v_q(t)$ so that the position $\theta$ and electrical parameters $R, L_\Sigma, L_\Delta$ can be reliably estimated from the presented equations. This "injection" should not affect the energy conversion, which occurs at low (DC) frequencies.

An embodiment of the present invention superimposes a voltage signal in the form of $$\begin{bmatrix} V_d^i \\ V_q^i \end{bmatrix} = \begin{bmatrix} V_d\cos(\omega_i t) \\ V_d\sin(\omega_i t) \end{bmatrix}$$

onto the existing motor control commands. The preferred embodiment uses a superimposed voltage signal of $$\begin{bmatrix} V_d^i \\ V_q^i \end{bmatrix} = \begin{bmatrix} V_d\cos(\omega_i t) \\ 0 \end{bmatrix},$$

i.e., $V_d\sin(\omega_i t)=0$. Note that in the case of no positional error ($\tilde{\theta}=0$), there is no variation in the torque-producing current ($i_q^i=0$). In practice, the injected frequency $\omega^i$ is of the order 800–850 Hz. We note that over the operating range of a typical elevator drive, the last term of Equation (1), the back-emf term, has negligible value at the injected frequency $\omega^i$. From Equation (1), the currents at the injected frequency satisfy the following equation:

$$\begin{bmatrix} I_d^i \\ I_q^i \end{bmatrix} =$$

$$\frac{1}{(L_\Sigma^2 - L_\Delta^2)(\hat{\omega}^2 - \omega_i^2) + 4L_\Delta^2 \tilde{\omega}(\hat{\omega} - \tilde{\omega}) + R^2 + 2j\omega_i L_\Sigma R} \begin{bmatrix} L_{11} & L_{12} \\ L_{21} & L_{22} \end{bmatrix} \begin{bmatrix} V_d^i \\ V_q^i \end{bmatrix},$$

where the entries of the matrix are as follows:

$L_{11} j\omega_i(L_\Sigma - L_\Delta \cos 2\tilde{\theta}) - \hat{\omega} L_\Delta \sin 2\tilde{\theta} + 2\tilde{\omega} L_\Delta \sin 2\tilde{\eta} + R$ $L_{12} j\omega_i L_\Delta \sin 2\tilde{\theta} + \hat{\omega}(L_\Sigma - L_\Delta \cos 2\tilde{\theta}) + 2\tilde{\omega} L_\Delta \cos 2\tilde{\theta}$ $L_{21} j\omega_i L_\Delta \sin 2\tilde{\theta} - \hat{\omega}(L_\Sigma + L_\Delta \cos 2\tilde{\theta}) + 2\tilde{\omega} L_\Delta \cos 2\tilde{\theta}$ $L_{22} j\omega_i(L_\Sigma + L_\Delta \cos 2\tilde{\theta}) + \hat{\omega} L_\Delta \sin 2\tilde{\theta} - 2\tilde{\omega} L_\Delta \sin 2\tilde{\eta} + R$ In the estimation scheme, the position error can now be derived from the $L_{21}$ term. Calculation of the imaginary component of $L_{21}$, enables minimization of the effects of speed dependence at the high-speed operating region. Note that the resistance actually has an important effect in adding phase to denominator, possibly making the estimation challenging. However, the injected frequency can be selected so that the terms involving $\omega^i$ dominate in all expressions. Furthermore, typical delays can be calculated for expected operating points and later compensated for. In our experiments we used the injected frequency high enough ($\omega_i/\omega_{rated} \cong 20$) to improve on the signal-to-noise ratio.

Note that when a voltage feed-forward signal is injected in the d-axis (d=direct or magnetizing axis), then the phase of the signal at the d-axis and the signal level at the q-axis (q=quadrature or torque axis) at the injected signal frequency are altered by the current being fed back in the current regulators. To prevent this distortion of the injected signals, notch filters of sufficient width are used before the feed-forward voltage injection. Note also that the estimated frame q-axis feedback current contains position error information at the injected frequency. One method for driving this error to zero efficiently is to use an observer.

Referring to FIG. 1, an observer controller 10 is shown with an input $\alpha\theta(\tilde{\theta}=\theta-\hat{\theta})$ which is the error in position. The input $\alpha\theta$ is amplified by an amplifier 12 and separately passed through an integrator 14 and an amplifier 16. The outputs of amplifier 12 and integrator 14 are combined at 18. The output of 18 is passed through an integrator 20 and combined at 22 with the output of amplifier 16 before passing through an integrator 24. The output of integrator 24 is the position estimate $\hat{\theta}$ while the frequency estimate $\hat{\omega}$ is taken from the output of integrator 20. The observer replaces the encoder in the prior art. The observer changes the position estimate $\hat{\omega}$ such that the position error signal at its input is driven to zero, i.e., the estimated rotor position is driven close to the actual rotor position. The observer estimates (observes) the position and velocity of the motor shaft and the amount of torque mismatch between the demand of the elevator motion and the one supplied by the power electronics. This observer as it stands different from other observers designed for the same purpose. The choice of $K_p$, $K_I$, and $\beta$ are made such that the characteristic polynomial $s^3 + \beta s^2 + K_p s + K_I$ satisfies the dynamical requirements. $K_p$ is the proportional constant of the system and $K_I$ is the integral constant of the system. In our case, using the pole placement method, we choose all poles to be placed at 20 rad/sec. Information needed for initialization of the sensorless control algorithm initially is obtained from a separate initial position detection algorithm, such as, for example, one of the algorithms disclosed in U.S. Pat. No. 5,608,300 (Kawabata et al.) or U.S. Pat. No. 5,952,810 (Yamada et al.), that is executed before every lifting of the elevator brake.

Figure 2:
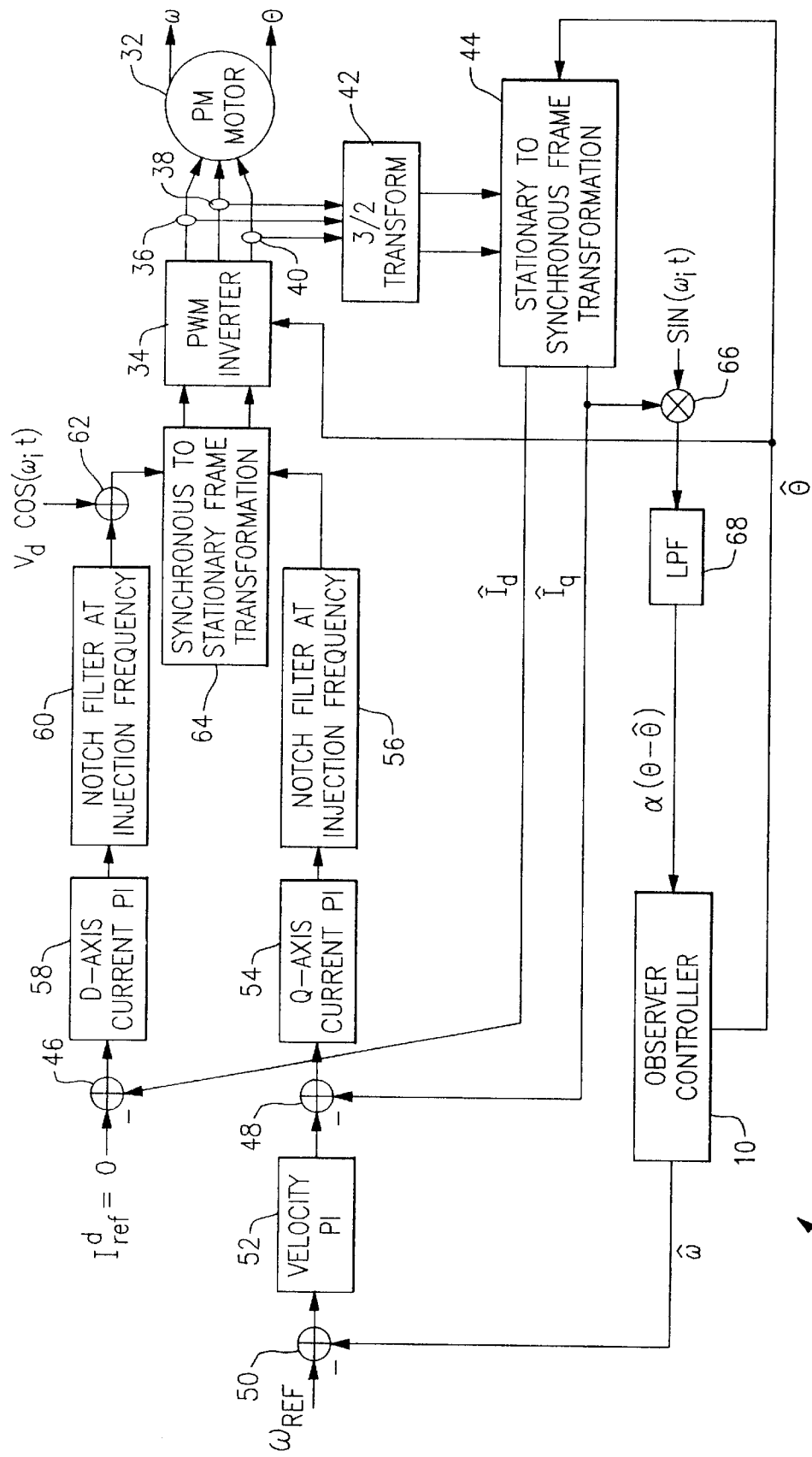
FIG. 2 shows a control circuit for an embodiment of the encoderless drive of the present invention.

Referring to FIG. 2, a control circuit 30 for an embodiment of the encoderless drive of the present invention is shown. A permanent magnet synchronous motor 32 is controlled by an output of a PWM (pulse width modulation) inverter 34. Motor 32 outputs an actual position $\theta$ and an actual speed $\omega$. Current sensors 36, 38, 40 sense the output of PWM inverter 24, and their output is converted, typically by software, in a 3/2 transform block 42 where the measured signals are converted from 3-phase to 2-phase in a stationary frame. The 2-phase signals are multiplied by the synchronous transform matrix in stationary to synchronous frame transformation block 44. The output $\hat{\theta}$ from observer controller 10 is input into the transform matrix. The d-current feedback $\hat{I}_d$ from block 44 is subtracted from the reference d-current $I_{ref}^d$ at a summing junction 46, with the result passing through a d-axis current regulator 58 and a notch filter 60 that rejects $\omega_i$. The output of notch filter 60 is injected with an injection voltage $V_d \cos(\omega_i t)$ at a summing junction 62 before going to a synchronous to stationary frame transformation block 64, where the signal is transformed so it is understandable to PWM converter 34.

The frequency estimate $\hat{\omega}$ from observer controller 10 is subtracted from a reference frequency $\omega_{ref}$ at a summing junction 50. The output is sent to a proportional integral controller 52. The q-current feedback $\hat{I}_q$ from block 44 is subtracted from the output of proportional integral controller 52 at a summing junction 48 before entering a q-axis current regulator 54. The output of regulator 54 is passed through a notch filter 56 which rejects $\omega_i$. The output of notch filter 56 goes to stationary frame transformation block 64, where the signal is transformed so it is understandable to PWM converter 34.

A demodulation signal $\sin(\omega_i t)$, which is 90 degrees out of phase with the injected signal $V_d \cos(\omega_i t)$, is combined with the q-current feedback $\hat{I}_q$ at 66 before passing through a low pass filter 68. The signal from low pass filter 68 is the input $\alpha\theta$ to observer 10.

Figure 3:
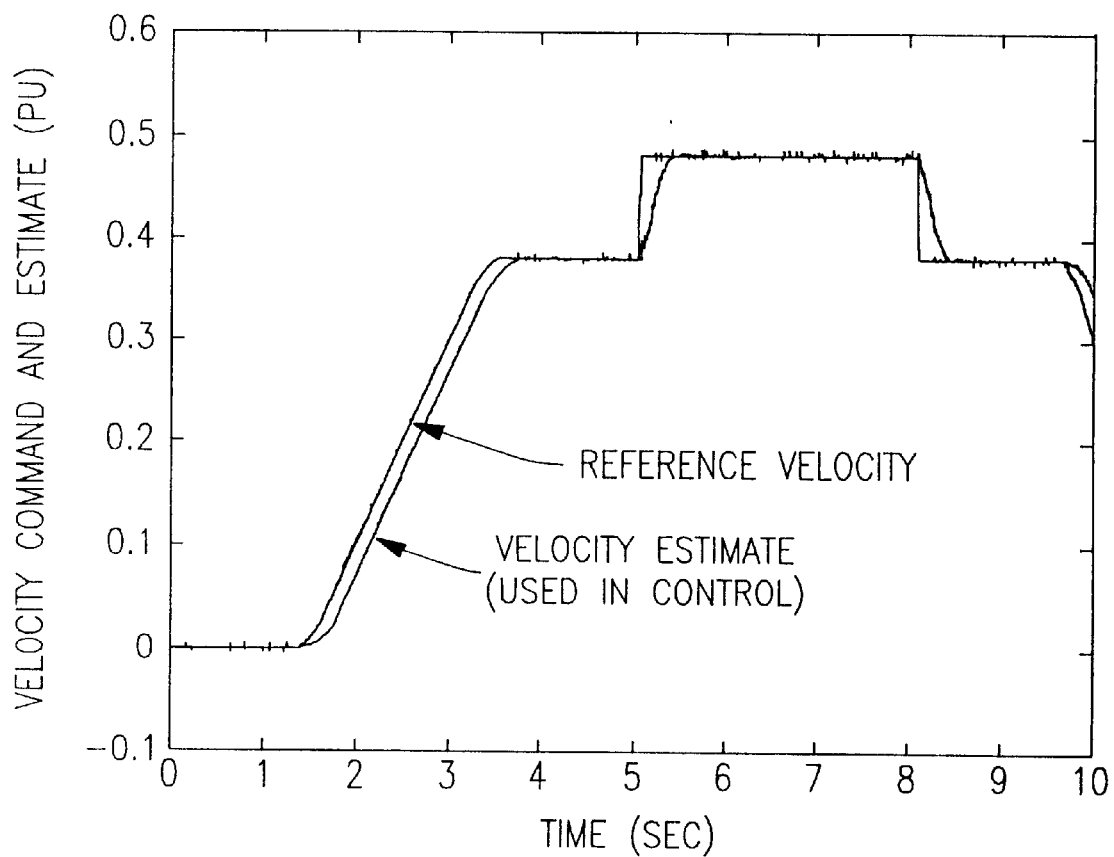
FIG. 3 shows a velocity estimate obtained using the present invention compared with a reference velocity.

Referring to FIG. 3, the velocity estimate obtained using the present invention is compared with the reference velocity that we want to track. The velocity estimate obtained using the present invention is almost identical to the velocity estimate using an encoder.

Examining the circuits of FIGS. 1 and 2, we note that the position $\theta$ varies much faster than the electrical parameters (the inductance based on the load). Thus, one is led to a multi-stage estimation procedure in which the mechanical parameters, i.e., position, is estimated in the fastest block, while electrical parameters (and possibly speed) are estimated at a slower rate. Also note that the estimation of electrical parameters (conditioned on the knowledge of position) is a linear problem. Additional embodiments include (1) time-varying $\omega_i$, possibly with a random component for acoustic noise reduction, (2) injection at more than one frequency $\omega_i$ to improve the conditioning of the estimation problem, and (3) injection in both axes (i.e., $V_q^i \neq 0$) to improve the conditioning of the estimation problem. Note that we are using steady-state relationships to model the electrical subsystem, so the injection frequency $\omega_i$ has to be maintained near a fixed value for several cycles (say 10) of $\omega_i$.

The purpose of injecting a signal is to spread the frequency spectrum of the injected signal such that it is not a pure tone but rather like noise so it is less disturbing to customers and/or users. A time varying signal such as $\omega_{io}+\sin(\omega t)$ optionally replaces all instances of $\omega_i$ in FIG. 2. The first dc term of the frequency is constant while the sinusoidal part is a slowly varying signal. This has the effect of causing the injected signal to be heard as noise rather than a tone.

Figure 4A:
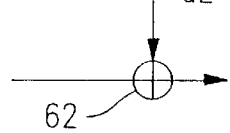
FIG. 4A shows an alternate embodiment of a control circuit according to the present invention.
Figure 4B:
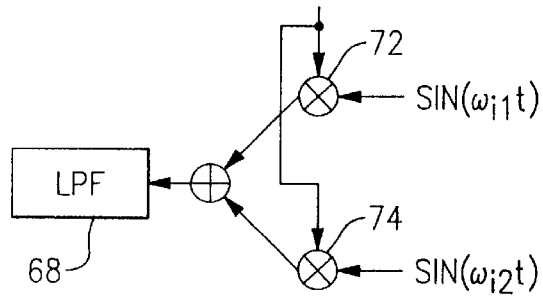
FIG. 4B shows an alternate embodiment of a control circuit according to the present invention.

Referring to FIGS. 4A–4B, two frequencies, $V_{d1} \cos(\omega_{i1}t)+V_{d2} \cos(\omega_{i2}t)$, are optionally injected at summing junction 62. This necessitates a change in the feedback loop, where demodulation signals $\sin(\omega_{i1}t)$ and $\sin(\omega_{i2}t)$ are separately combined with the q-current feedback $\hat{I}_q$ at 72 and 74, respectively, before passing through low pass filter 68. Additional frequencies would be injected in similar fashion.

Figure 5A:
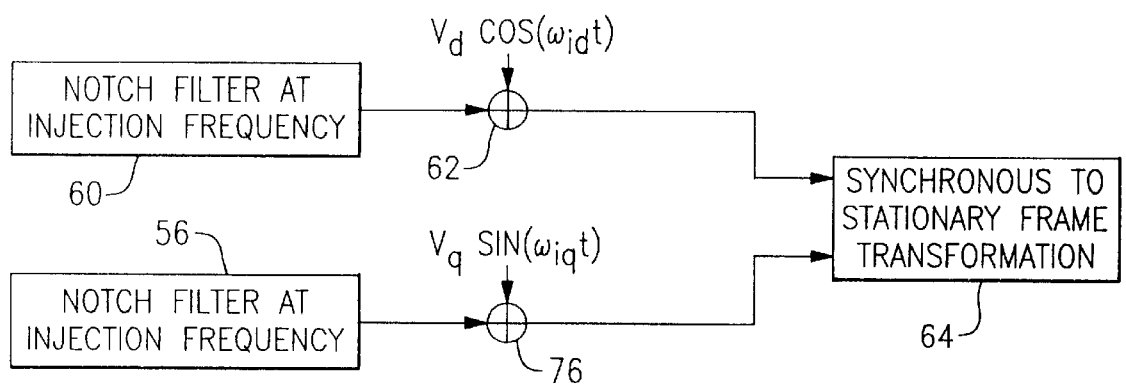
FIG. 5A shows an alternate embodiment of a control circuit according to the present invention.
Figure 5B:
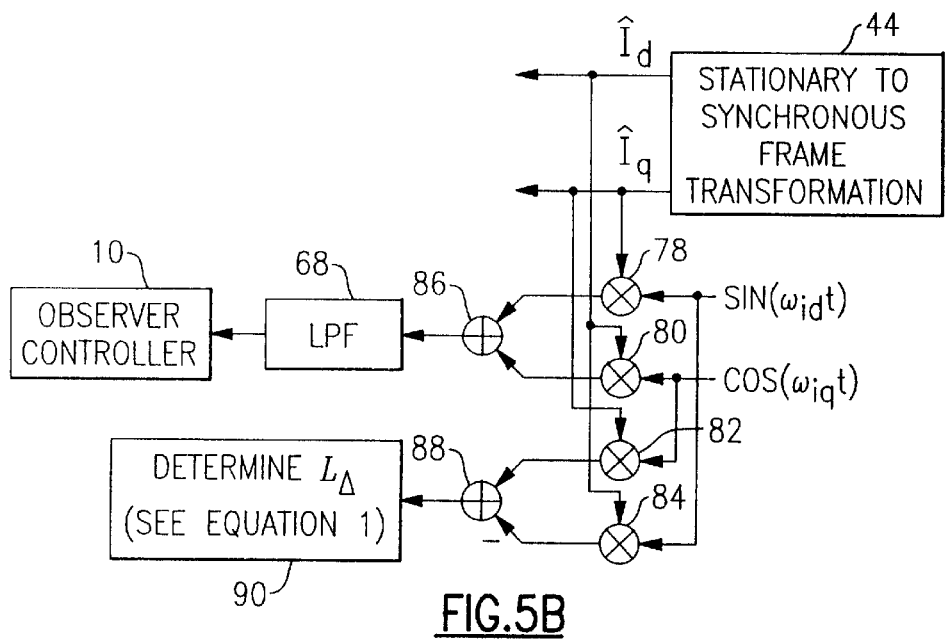
FIG. 5B shows an alternate embodiment of a control circuit according to the present invention.

Referring to FIGS. 5A–5B, injecting signals into both axes is done for the purpose of improving the signal-to-noise ratio of the signal obtained after the LPF block and for estimating all inductance components of the motor. The inductance components, $L_{11}$, $L_{12}$, $L_{21}$, and $L_{22}$, are described in Equation (3). $L_{12}$, $L_{21}$, enable generation of an error signal necessary for driving controller observer 10 while $L_{11}$ and $L_{22}$ enable determination of the d-axis and q-axis inductances. These ($L_{11}$ and $L_{22}$) inductances can also be used for the design of the current regulators and for determination of the quality of the estimate through the sensor-less operation. In addition to injecting voltage $V_d \cos(\omega_{id}t)$ into the d-axis at summing junction 62, an additional injection voltage $V_9 \sin(\omega_{i9}t)$ is injected into the q-axis at a summing junction 76. The two injection frequencies could be the same or different.

The necessary change in the feedback loop is shown in FIG. 5B. Both of the axis currents, $I_d$ and $I_q$, are processed. Demodulation signals $\sin(\omega_{id}t)$, $\cos(\omega_{id}t)$ are combined with the q-current feedback $\hat{I}_q$ at 78 and the d-current feedback $\hat{I}_q$ at 80, respectively, before being added at a summing junction 86 before passing through low pass filter 68. In addition, demodulation signals $\sin(\omega_{id}t)$, $\cos(\omega_{id}t)$ are optionally combined with the q-current feedback $\hat{I}_q$ at 82 and the d-current feedback $\hat{I}_q$ at 84, respectively, before being subtracted at a summing junction 88 for use in determining $L_A$ in block 90. Determining $L_A$ provides information regarding whether the method of the present invention is still reliable to use. This is preferable because as the motor is loaded, the rotor iron saturates and $L_A$ gets closer to zero, which is not good for the quality of the estimation. Monitoring $L_A$ thus determines the extent to which the method of the present invention can be used reliably.

We believe the following features to be unique: (1) the multi-stage nature of estimation (position in the fast loop, electrical parameters in the slow loop), (2) the electrical parameters may be useful for the main drive controller, and also for the estimator itself, as the dependence to machine parameters that change in operation are reduced, (3) the injection of more than one frequency, (4) the injection with time-varying frequency, optionally with a random component, and (5) the injection of distinct signals into the two axes, optionally with different frequencies.

Note that, unlike the prior art, filtering of the injected filter occurs in notch filters 56, 60 and not in the feedback loop. This is an important difference in the case of command signals with some spectral content near the injected frequency. Such a signal component, which potentially degrades the estimation process, is eliminated by the notch filters.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. Apparatus for determining speed and position of a permanent magnet synchronous motor, comprising:

d-axis current means for providing d-axis current to said motor;

said d-axis current means including a d-current feedback loop;

q-axis current means for providing q-axis current to said motor;

said q-axis current means including a q-current feedback loop;

means for injecting a first signal into said d-axis current means;

position estimating means for measuring current feedback responsive to said injected first signal to determine an estimated position of said motor;

speed estimating means for measuring current feedback responsive to said injected first signal to determine an estimated speed of said motor;

sensing means for sensing currents in 3-phase control signals controlling said motor;

first transformation means for transforming said sensed currents to 2-phase stationary frame signals;

second transformation means for transforming said stationary frame signals to synchronous frame signals; and an observer controller receiving input from said q-current feedback loop and providing a position estimate to second transformation means.

2. Apparatus for determining speed and position of a permanent magnet synchronous motor, comprising:

d-axis current means for providing d-axis current to said motor;

said d-axis current means including a d-current feedback loop;

q-axis current means for providing q-axis current to said motor;

said q-axis current means including a q-current feedback loop;

means for injecting a first signal into said d-axis current means;

position estimating means for measuring current feedback responsive to said injected first signal to determine an estimated position of said motor;

speed estimating means for measuring current feedback responsive to said injected first signal to determine an estimated speed of said motor;

an observer controller receiving input from said q-current feedback loop and providing a speed estimate to said q-axis current means;

sensing means for sensing currents in 3-phase control signals controlling said motor;

first transformation means for transforming said sensed currents to 2-phase stationary frame signals;

second transformation means for transforming said stationary frame signals to synchronous frame signals; and said observer controller providing a position estimate to second transformation means.

3. Apparatus according to claim 2, further comprising first demodulation means wherein said input to said observer controller from said q-current feedback loop is demodulated with a second signal before entering said observer controller, said second signal being 90 degrees out of phase with said first signal.

4. Apparatus according to claim 3, wherein said demodulated input to said observer controller from said q-current feedback loop is passed through a low pass filter before entering said observer controller.

5. Apparatus according to claim 3, wherein said d-axis current means includes a first notch filter at a frequency of said first signal and said q-axis current means includes a second notch filter at said frequency of said first signal, wherein said first notch filter is positioned exclusive of said d-current feedback loop and said second notch filter is positioned exclusive of said q-current feedback loop.

6. Apparatus according to claim 3, wherein said first signal has a time-varying frequency.

7. Apparatus according to claim 3, further comprising:
means for injecting a third signal into said d-axis current means;
second demodulation means for demodulating said q-current feedback loop with a fourth signal; and
summing means for summing outputs from said first and second demodulation means and sending an output of said summing means to said observer controller.

8. Apparatus according to claim 3, further comprising:
means for injecting a third signal into said q-axis current means;
second demodulation means for demodulating said d-current feedback loop with a fourth signal; and
summing means for summing outputs from said first and second demodulation means and sending an output of said summing means to said observer controller.

9. Apparatus according to claim 8, further comprising:
third demodulation means for demodulating said q-current feedback loop with said fourth signal;
fourth demodulation means for demodulating said d-current feedback loop with said second signal;
second summing means for subtracting an output of said fourth demodulation means from an output of said third demodulation means; and
means, responsive to an output from said second summing means, for determining a value for a differential inductance of said d-axis current means and said q-axis current means.

10. Apparatus according to claim 2, wherein
said observer controller receives said input and processes said input in first, second, and third branches;
a first portion of said first branch amplifies said input signal by a first constant;
said second branch integrates said input signal using a second constant;
an output of said second branch and an output of said first portion are combined into a first combined signal in a second portion of said first branch;
said first combined signal is integrated to produce an integrated first combined signal, wherein said speed estimate is taken from said integrated first combined signal;
said third branch amplifies said input signal by a third constant;
an output of said third branch and said integrated first combined signal are combined in a third portion of said first branch to produce a second combined signal; and
said second combined signal is integrated to produce said position estimate.

11. A method for determining speed and position of a permanent magnet synchronous motor, comprising the steps of:
providing d-axis current to said motor, including providing a d-current feedback loop;
providing q-axis current to said motor, including providing a q-current feedback loop;
injecting a first signal into said d-axis current outside of said d-current feedback loop;
measuring current feedback responsive to said injected first signal to determine an estimated position of said motor;
measuring current feedback responsive to said injected first signal to determine an estimated speed of said motor;
sensing currents in 3-phase control signals controlling said motor;
transforming said sensed currents to 2-phase stationary frame signals;
transforming said stationary frame signals to synchronous frame signals; and
receiving input from said q-current feedback loop and providing a position estimate for use in the step of transforming said stationary frame signals to synchronous frame signals.

12. A method for determining speed and position of a permanent magnet synchronous motor, comprising the steps of:
providing d-axis current to said motor, including providing a d-current feedback loop;
providing q-axis current to said motor, including providing a q-current feedback loop;
injecting a first signal into said d-axis current outside of said d-current feedback loop;
measuring current feedback responsive to said injected first signal to determine an estimated position of said motor;
measuring current feedback responsive to said injected first signal to determine an estimated speed of said motor;
receiving input from said q-current feedback loop;
providing a speed estimate based on said input from said q-current feedback loop;
combining said speed estimate with a reference frequency to be used in the step of providing q-axis current;
sensing currents in 3-phase control signals controlling said motor;
transforming said sensed currents to 2-phase stationary frame signals;
transforming said stationary frame signals to synchronous frame signals; and
providing a position estimate, based on input from said q-current feedback loop, to be used in the step of transforming said stationary frame signals to synchronous frame signals.

13. Method according to claim 12, further comprising the step of demodulating q-current feedback with a second signal before using said input from said q-current feedback loop to determine said speed estimate and said position estimate, said second signal being 90 degrees out of phase with said first signal.

14. Method according to claim 13, further comprising the step of passing said demodulated q-current feedback through a low pass filter before using said input from said q-current feedback loop to determine said speed estimate and said position estimate.

15. Method according to claim 13, wherein said step of providing d-axis current includes the step of filtering out a frequency of said first signal and said step of providing q-axis current includes filtering out said frequency of said first signal, wherein said steps of filtering out said frequency of said first signal are performed exclusive of said d-current feedback loop and said q-current feedback loop.

16. Method according to claim 13, wherein said first signal has a time-varying frequency.

17. Method according to claim 13, further comprising the steps of:

injecting a third signal into said d-axis current;

demodulating said q-current feedback loop with a fourth signal; and summing outputs from the steps of demodulating with said second and fourth signals; and sending an output of said step of summing to said observer controller.

18. Method according to claim 13, further comprising the steps of:

injecting a third signal into said q-axis current;

demodulating said d-current feedback loop with a fourth signal;

summing outputs from the steps of demodulating with said second and fourth signals; and sending an output of said step of summing to said observer controller.

19. Method according to claim 18, further comprising:

demodulating said q-current feedback loop with said fourth signal;

demodulating said d-current feedback loop with said second signal;

subtracting an output of the step of demodulating with said second signal from an output of the step of demodulating with said fourth signal; and determining, based on the previous step, a value for a differential inductance of said d-axis current and said q-axis current.

20. Method according to claim 13, wherein said steps of providing said speed estimate and said position estimates include:

receiving said input and processing said input in first, second, and third branches;

amplifying said input signal by a first constant in a first portion of said first branch;

integrating said input signal in said second branch using a second constant;

combining an output of said second branch and an output of said first portion into a first combined signal in a second portion of said first branch;

integrating said first combined signal to produce an integrated first combined signal, wherein said speed estimate is taken from said integrated first combined signal;

amplifying said input signal by a third constant in said third branch;

combining an output of said third branch and said integrated first combined signal in a third portion of said first branch to produce a second combined signal; and integrating said second combined signal to produce said position estimate.

* * * * *